United States Patent [19]

Shaffer

[11] 4,437,955
[45] Mar. 20, 1984

[54] COMBINED AC AND DC ETCHING OF ALUMINUM FOIL

[75] Inventor: Jesse S. Shaffer, Columbia, S.C.

[73] Assignee: U.S. Philips Corporation, New York, N.Y.

[21] Appl. No.: 510,530

[22] Filed: Jul. 5, 1983

[51] Int. Cl.$^3$ .............................................. C25F 3/04
[52] U.S. Cl. ............................ 204/129.4; 204/129.75; 204/129.95; 204/DIG. 8
[58] Field of Search ......... 204/129.4, 129.75, DIG. 8, 204/DIG. 9, 129.95

[56] References Cited

U.S. PATENT DOCUMENTS

| 3,779,877 | 12/1973 | Alwitt | 204/129.75 |
| 3,935,080 | 1/1976 | Gumbinner et al. | 204/129.75 X |
| 4,297,184 | 10/1981 | Dyer | 204/129.4 |
| 4,374,710 | 2/1983 | Walls | 204/129.95 X |

FOREIGN PATENT DOCUMENTS

| 1496725 | 7/1971 | Fed. Rep. of Germany | 204/129.75 |
| 52-64659 | 5/1977 | Japan | 204/129.75 |

*Primary Examiner*—Donald R. Valentine
*Attorney, Agent, or Firm*—Norman N. Spain

[57] ABSTRACT

Aluminum foil exhibiting a good combination of capacitance and mechanical strength is produced by an etching procedure that includes the steps of AC pre-etching aluminum foil in an acid bath containing hydrochloric acid and then, without removing the hydrochloric acid from the foil, etching the foil with a high density DC while the foil is immersed in an aqueous solution of sodium chloride and sodium sulfate.

4 Claims, No Drawings

COMBINED AC AND DC ETCHING OF ALUMINUM FOIL

BACKGROUND OF THE INVENTION

This invention relates to a method of electrolytically etching aluminum foil particularly for use as aluminum electrodes or foils for electrolytic capacitors. More particularly, this invention relates to a method of electrolytically etching aluminum foil in which both alternating current (AC) and direct current (DC) electrolytic etching are employed. Further this invention relates to aluminum foil produced by the method of the invention.

The purpose of etching aluminum foil particularly for use in electrolytic capacitors is to increase the effective surface of the foil as the capacitance of an electrolytic capacitor is proportional to the effective surface of the aluminum foils or electrodes employed in the capacitor.

During the etching process a certain amount of aluminum is removed from the foil. Because of this loss of aluminum frequently there is a mechanical weakening of the foil. This mechanically weakened foil, whose electrical characteristic is satisfactory for use in capacitors, has been found unsatisfactory for commercial production of electrolytic capacitors; particularly when the foil is required to have sufficient strength needed for the high speed winding of capacitor rolls employed in commercial practice.

Prior art electrolytic methods of etching aluminum have consisted of continuous or intermittent AC etching in acid baths for example as shown in Arora U.S. Pat. Nos. 4,315,806, and 4,376,686 or by DC etching as shown in U.S. Pat. No. 3,884,783. It is also known in the prior art to etch aluminum in an electrolytic solution in which a fluctuating unidirectional current is employed. This is as shown for example in the G.B. Pat. Specification No. 985024.

Japanese Kokai No. 78 19151 shows a combination of first electrolytically etching aluminum foil in an aqueous hydrochloric acid solution with AC, washing the foil to remove the hydrochloric acid from the foil, roasting the foil at 300° C.–500° C. and then further electrolytically etching the foil in an aqueous solution of hydrochloric acid solution employing DC at a current density of 1 amp/cm² or 1.2 amps/cm₂.

These known methods of electrolytically etching aluminum foil for use in electrolytic capacitors have not been too satisfactory as the resultant foils, after forming, do not exhibit a combination of desired capacitance and mechanical strength suitable for use in the commercial capacitor rolls capable of withstanding the high speed winding employed in commercial practice or if a desired combination of capacitance and mechanical strength is achieved it is accomplished by use of an expensive and time-consuming combination of steps, for example as set out in the aforementioned Japanese Kokai No. 78 19151.

SUMMARY OF THE INVENTION

A principal object of this invention is to provide an improved method for electrolytic etching of aluminum foil particularly for use in eleclrolytic capacitors.

Another principal object of the invention is to provide a method for the electrolytic etching of aluminum foil in which the resultant foil, after forming, exhibits a capacitance satisfactory for use in electrolytic capacitors and retains sufficient mechanical strength to enable the use of such foil in high speed wound capacitor rolls employed in commercial practice while employing a method that is less expensive and less time consuming than that employed in the previous art for example that employed in the Japanese Kokai No. 78 19151.

According to the novel method of the invention, aluminum foil is first immersed in an aqueous acid solution containing, by weight, 1–6% of hydrochloric acid, 0–2% of phosphoric acid and 0–2% of nitric acid and while, this aqueous acid solution is heated to 30°–60° C., the foil is pre-etched with AC of a frequency of 15–100 Hertz and a current density of 0.1–2.0 amperes per square centimeter until at least about 0.05 milligrams per square centimeter ($mg/cm_2$) of aluminum is removed from the foil. Then, according to the method of the invention, without removal of the hydrochloric acid from the foil, the foil is immersed in an aqueous solution containing about 18–26% by weight of sodium chloride and either about 0.3–2% by weight of sodium sulfate or about 1–4% by weight of boric acid, and while this solution is maintained at 80° C.–100° C., the foil is etched with DC of a current density of about 2–5 amperes per square centimeter ($amps/cm^2$) until, in total, including the aluminum removed in the AC pre-etching step, at least about 7 $mg/cm^2$ of aluminum is removed.

It has been found that such a combination of first AC pre-etching the aluminum foil in a hydrochloric acid solution and then, without removing the hydrochloric acid from the foil, immersing the foil in an aqueous solution of sodium chloride and sodium sulfate and etching the foil by use of high density DC results in a high degree of etching while the strength of the foil remains sufficiently satisfactory to allow the foils to be used in capacitor rolls subjected to commercial winding speeds.

Preferably the foil is cleaned prior to the AC preetching by use of an alkaline cleaning solution or a degreaser such as trichloroethane.

Preferably also the current density of the AC employed in the pre-etch step is 0.1–2 $amps/cm^2$. Further, if the acid solution employed in the pre-etch step contains phosphoric acid, it preferably contains from 0.5–2% by weight of phosphoric acid.

The DC etching preferably is carried out until in total 7–14 $mg/cm^2$ of aluminum is removed from the foil.

DESCRIPTION OF THE PREFERRED EMBODIMENT

In order that the invention may be more readily understood it will now be described in greater detail with reference to the following examples:

EXAMPLE 1

Samples of aluminum foil, of H-19 hardness, 1196 purity and a thickness of 100 microns after being degreased in a 1.5% alkaline solution, were immersed in a 1.5% by weight aqueous solution of hydrochloric acid heated to 50° C., and, while immersed in this solution, were pre-etched with 30 Hertz AC of a current density of 1.2 $amps/cm^2$. This pre-etching procedure was carried out for three seconds resulting in an average weight loss of foil of about 0.34 $mg/cm^2$.

The pre-etched aluminum samples were then removed from the hydrochloric acid solution and, without removal of hydrochloric acid, were immersed in an aqueous solution containing 22% by weight of NaCl and 2.0% by weight of $Na_2SO_4$ and maintained at 95°

C., and, while immersed in this solution, were etched with DC of a current density of 2.5 amps/cm$^2$. This etching with DC was continued until 97 Coulombs were employed. As a result 9.2 mg/cm$^2$ of aluminum were removed from the foil resulting in a total amount of 9.54 mg/cm$^2$ of aluminum being removed from the foil.

In Table I there are recited various results for two samples etched according to this example and for an aluminum sample etched according to a typical known procedure wherein the aluminum foil was etched with DC of a current density of 1.3 amps/cm$^2$ without pre-etching. The table shows total weight loss of aluminum resulting from the combined AC pre-etching and DC etching steps, (weight loss mg/cm$^2$) the number of b 90° bends the samples were subjected to before the samples broke (Mechanical Bends) and capacitance after forming (capacitance mf/cm$^2$).

The capacitance was measured on the samples formed at the indicated voltages in a solution of ammonia tartrate.

TABLE I

| Sample | Forming Voltage Volts | Capacitance uF/cm$^2$ | Weight Loss mg/cm$^2$ | Mechanical Bends |
|---|---|---|---|---|
| 1 | 52.3 | 16.9 | 9.6 | 19 |
| 2 | 52.8 | 16.9 | 9.5 | 17 |
| Typical low current DC current etching (1.5 amps/cm$^2$) | 52.1 | 14.7 | 7.9 | 9 |

EXAMPLE 2

Additional samples of aluminum foil were etched in the same manner as in Example I except that in the DC etching step 112 Coulombs/cm$^2$ were employed. Results for samples etched according to the method of this example are shown in Table II.

TABLE II

| Sample | Forming Voltage Volts | Capacitance uF/cm$^2$ | Weight Loss mg/cm$^2$ | Mechanical Bends |
|---|---|---|---|---|
| 3 | 52.8 | 19.7 | 12.4 | 4 |
| 4 | 52.8 | 20.9 | 12.4 | 3 |

An aluminum foil etched according to standard prior art etch processes employing sulfated brine has no mechanical strength at this weight loss.

EXAMPLE 3

A sample of aluminum foil of H-19 hardness, 1199 purity and a thickness of 100 microns was degreased in 1% phosphoric acid and then immersed in an aqueous solution containing by weight 6% hydrchloric acid and 1% phosphoric acid heated to 60° C. While immersed in this solution, the sample was pre-etched with 30 Hertz AC of a current density of 1.2 amps/cm$^2$. This pre-etching procedure was carried out for seventeen seconds resulting in an average weight loss of about 2 mg/cm$^2$.

The pre-etched sample was then removed from the pre-etch solution and, without removal of the acids, was immersed in an aqueous solution containing by weight 20% NaCl and 3% boric acid and maintained at 93° C. and, while immersed in this solution, etched with DC of a current density of 2.8 amps/cm$^2$. The etching with DC was continued until 84 Coulombs were employed.

The sample was then annealed for 20 minutes at 525° C. and formed in an ammonium adipate solution.

Result for this sample is shown in Table III.

TABLE III

| Sample | Forming Voltage Volts | Capacitance uF/cm$^2$ | Weight Loss mg/cm$^2$ | Mechanical Bends |
|---|---|---|---|---|
| 5 | 51.7 | 17.9 | 11.4 | 11 |

It will be apparent that various modifications may be made to the method of the present invention without departing from its scope as defined by the following claims.

What is claimed:

1. A process for the electrolytic etching of aluminum capacitor foil comprising pre-etching said foil by immersing said foil in a first aqueous electrolyte bath containing, by weight, from 1-6% of HCl, 0-2% of H$_3$PO$_4$ and 0-2% of HNO$_3$ while being subjected to an AC of a current density of 0.1-2.0 amps/cm$^2$ and a frequency of 15-100 Hertz while said first electrolyte bath is maintained at a temperature of 30°-60° C. until a loss of weight of said foil of at least about 0.05 mg/cm$^2$ is achieved and then, without removing the HCl from said foil, etching said foil by immersing said foil in a second aqueous electrolyte bath containing, by weight, 18-26% of NaCl and either 0.3-2% of Na$_2$SO$_4$ or 1-4% of boric acid while being subjected to DC of a current density of 2-5 amps/cm$^2$ while said second electrolyte bath is maintained at a temperature of about 80°-100° C. until a total loss of weight of said foil of at least about 7 mg/cm$^2$ is achieved.

2. The process of claim 1 wherein the bath employed in the AC pre-etching step contains from 0.5-2% by weight of H$_3$PO$_4$.

3. The process of claim 2 wherein the pre-etch step is continued until a weight loss of the foil of about 0.05-2.0 mg/cm$^2$ is achieved and the etching step is continued until a total weight loss of said foil of about 7-14 mg/cm$^2$ is achieved.

4. Etched aluminum foil particularly adapted for use in electrolytic capacitors produced by the method of claim 1.

* * * * *

UNITED STATES PATENT AND TRADEMARK OFFICE
CERTIFICATE OF CORRECTION

PATENT NO. : 4,437,955
DATED : March 20, 1984
INVENTOR(S) : JESSE S. SHAFFER

It is certified that error appears in the above—identified patent and that said Letters Patent is hereby corrected as shown below:

(73) Assignee:

"U.S. Philips Corporation"

should be --North American Philips Corporation--.

Signed and Sealed this

Third Day of July 1984

[SEAL]

Attest:

GERALD J. MOSSINGHOFF

Attesting Officer

Commissioner of Patents and Trademarks